Nov. 19, 1968     T. H. BRETT ET AL     3,411,820

REAR SEAT CUSHION RETAINING MEANS

Filed May 18, 1967     2 Sheets-Sheet 1

INVENTORS
Tom H. Brett,
William K. Norwick, &
Harold E. Rose
BY
E. J. Biskup
ATTORNEY

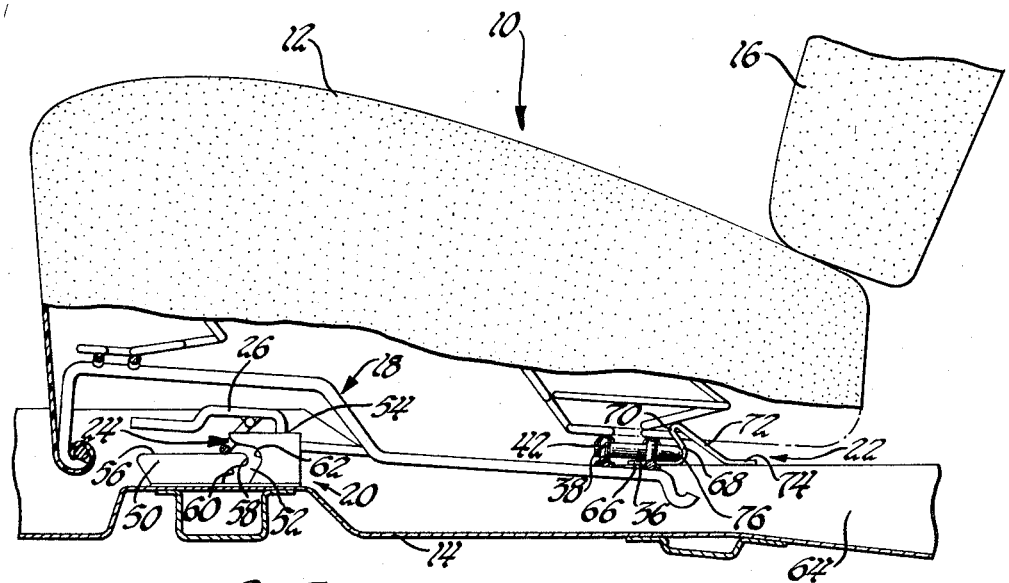

United States Patent Office

3,411,820
Patented Nov. 19, 1968

3,411,820
REAR SEAT CUSHION RETAINING MEANS
Tom H. Brett, Mount Clemens, William K. Norwick, Dearborn, and Harold E. Rose, Royal Oak, Mich., assignors to General Motors Corporation, Detroit, Mich., a corporation of Delaware
Filed May 18, 1967, Ser. No. 639,463
6 Claims. (Cl. 296—63)

ABSTRACT OF THE DISCLOSURE

A latching arrangement for a rear seating cushion wherein spring bars fixed to the seat spring structure are retained in the front by keepers fixed to the floor panel and at the rear by a retaining bracket located on the drive shaft tunnel.

---

Conventional rear seating cushions are usually retained in the front by a stop member and in the rear by wedging the seat cushion under the seat backrest. While such arrangement positively prevents forward movement of the seating cushion during periods of deceleration, rearward and upward movement of the cushion may not be similarly prevented. As a result of production variances in the spring structure and the seat pad thickness, as well as variations in the size and location of the vehicle floor panel, seat back and stop members, the wedging action against the backrest may be insufficient to properly retain the seating cushion in assembly. Where excessive wedging action is developed due to the above production variances, installation of the seating cushion may require excessive force thereby increasing the assembling time.

The seat latching arrangement made in accordance with the present invention overcomes the aforementioned problems by positively attaching the rear seating cushion to the vehicle floor panel at three points. During the assembly of the seating cushion, spring bars are attached to the underside of the spring structure adjacent the front corners and a similar spring bar is attached at the center of the rear portion. Similarly spaced front keepers and a rear retaining bracket are attached to the floor panel during assembly of the vehicle body. In the installed position, the spring bars are securely retained in C-shaped slots formed in the keepers and by a pocket formed in the rear retaining bracket. The only variable affecting seat placement and seat retention in this arrangement are the relative positions of the spring bars, keepers and retaining bracket. By using conventional testing methods, the location of each part can be checked prior to assembly to quickly and easily determine if quality control standards have been met. Additionally, the assembly of the seating unit is facilitated by camming surfaces formed on the keepers that positively guide the front spring bars downwardly into C-shaped slots upon rearward movement of the seat spring structure.

Accordingly, the objects of the present invention are; to provide a latching arrangement for a rear seating cushion wherein the front and rear portions of the cushion are positively located and securely retained; to provide a three-point suspension system for a rear seating cushion wherein spring bars attached to the cushion spring structure are forwardly retained in slots formed in laterally spaced and transversely aligned keepers mounted on the floor panel and rearwardly by a pocket formed in a retainer bracket located on the drive shaft tunnel; and to facilitate the installation of a vehicle rear seating cushion by providing a positively acting camming surface for locating the front of the seating cushion.

These and other objects will become apparent to one skilled in the art upon reading of the following detailed description, reference being made to the accompanying drawings in which:

FIGURE 3 is a side elevational view of the arrangement shown in FIGURE 1 prior to assembly.

FIGURE 4 is a perspective view of the keeper and the front spring bar shown in FIGURES 1 through 3.

FIGURE 5 is a perspective view of the retaining bracket and rear spring bar shown in FIGURES 1 through 3.

Figure 1:
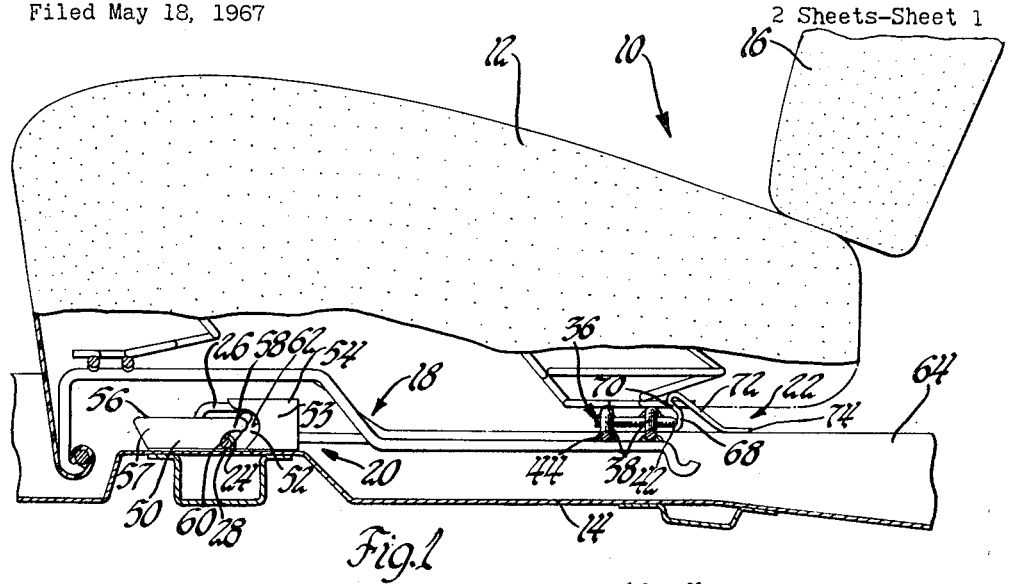
FIGURE 1 is a side elevational view showing an assembled rear seating arrangement made in accordance with the present invention.

Referring to FIGURE 1, the seating unit 10, in general, comprises a rear seating cushion 12 conventionally positioned with respect to the vehicle floor panel 14 and the rear seat back 16. The seat spring structure 18 is secured to the floor panel 14, in front, by keepers 20 and at the rear by a retaining bracket 22.

Figure 2:
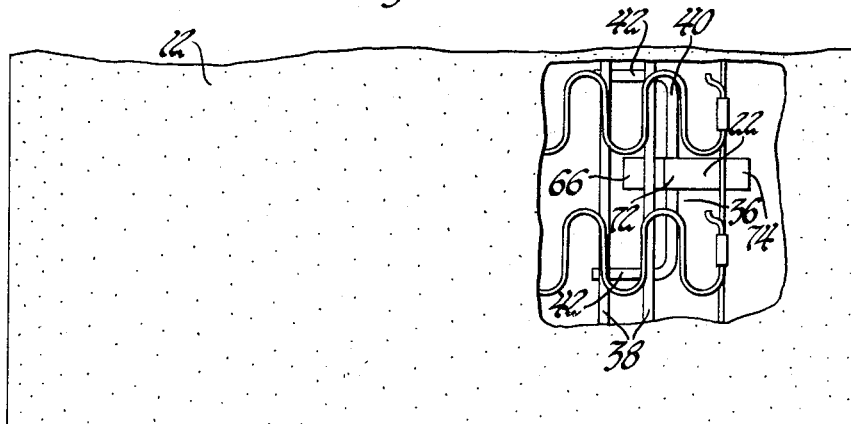
FIGURE 2 is a partial enlarged plan view of the arrangement shown in FIGURE 1.

The spring structure 18 may be of any design suitable to give the desired ride characteristics and includes a pair of front spring bars 24 attached to the longitudinally extending support rods 26 of the spring structure 18. The spring bars 24 are transversely aligned and laterally spaced with respect to the center line of the seating cushion 12 and are located toward the forward edge thereof. As shown most clearly in FIGURES 2 and 4, the forward spring bars 24 comprise a transversely extending middle portion 28, upwardly and rearwardly inclined arcuate portions 30 and reversely bent ends 32 that are attached to the support rods 26 by welds 34. A rear spring bar 36 is attached to transversely extending support rods 38 and is located rearwardly of the front spring bars 24 and substantially in the center of the seating cushion 12. As shown in FIGURE 5, the rear spring bar 36 is generally U-shaped and has a transversely extending center portion 40 and forwardly extending ends 42 that are attached to the support rods 38 by welds 44.

The keeper 20 is an integral sheet metal stamping bent so as to form outwardly extending support legs 46 and 48, each of which includes similarly shaped laterally spaced side walls 50. The side walls 50 are longitudinally divided by a generally C-shaped retaining slot 52 of sufficient size to accommodate the front spring bars 24. It will be noted that the opposing rearward portions 53 of the side walls 50 are joined at the top thereof by a bridge member 54 laying in a plane above the upper locating surface 56 of the front portion 57 of the side walls 50. The slot 52 opens forwardly adjacent locating surface 56 and, in general, defines a retaining lip 58, a forward retaining surface 60 and a rear camming surface 62. As will be described in full below, the retaining lip 58 and the retaining surface 60 prevent vertical and forward movement of the seating cushion 12, respectively, while the camming surface 62 facilitates assembly of the seating unit.

The keepers 20 are transversely aligned and spaced laterally outwardly from a centrally located longitudinally extending drive shaft tunnel 64 a distance substantially equal to the relative lateral spacing of the spring bars 24 so that, in assembly, the spring bars 24 will be received within the slots 52 and in engagement with the retaining surface 60. When the keepers 20 have been properly positioned, the support legs 46 and 48 may be secured to the floor panel 14 by welding or other suitable retaining means.

The retaining bracket 22 is formed of a sheet metal strip and includes a forwardly extending flange 66, a vertical leg 68, a forwardly upwardly inclined leg 70, a downwardly rearwardly inclined rear support leg 72, and a rearwardly extending flange 74. The vertical leg 68 and the inclined leg 70 form a retaining pocket 76 of sufficient size to accommodate the rear spring bar 36. The retaining bracket 22 should be located on the drive shaft tunnel 64 such that the longitudinal distance between retaining surface 60 of the keepers 20 and the vertical leg 68 is slightly less than the distance between the front spring bars 24 and the rear spring bar 36 to provide for compressive holding of the seating cushion 12.

To assemble the seating unit, the seating cushion 12 is laterally positioned with respect to the floor panel 14 and then moved rearwardly to the position shown in FIGURE 3 wherein the rear surface of the spring bar 36 engages vertical leg 68 and the front spring bars 24 rest on locating surface 56. Additional rearward movement of the seating cushion 12 will compress the spring structure 18 and guide the spring bars 24 into the retaining slots 52 and thereafter downwardly along the camming surface 62. Upon removal of the compressive force, the spring structure 18 will partially expand and the spring bars 24 will be guided by retaining lip 58 into compressive engagement with surface 60 as shown in FIGURE 1. In this position, it will be noted that the seating cushion 12 is positively retained. Forward movement is prevented by surface 60, rearward movement is prevented by vertical leg 68, and vertical movement is restrained by the retaining lip 58 and inclined leg 70.

Since other changes and modifications will be apparent to one skilled in the art, the invention, as defined in the appended claims, is intended to cover such alterations of the described embodiment.

What is claimed is:
1. In a vehicle having a floor panel and a rear seating cushion, a latching arrangement for locking the seating cushion to the floor panel comprising a pair of laterally spaced and transversely aligned keepers fixed to the floor panel, each of said keepers having a C-shaped slot formed therein, a retaining bracket fixed to the floor panel and located to the rear of said keepers and substantially midway therebetween, said retaining bracket having a pocket opening toward said keepers, and spring bars fixed wtih the underside of the seating cushion and located at points corresponding to the relative positions of the keepers and the retaining bracket, two of the spring bars located adjacent the front of the cushion and one spring bar located to the rear of the cushion, said pocket adapted to accommodate and restrain rearward movement of the rear spring bar while the forward spring bars are moved into said slots to lock the seating cushion to the floor panel.

2. The invention as recited in claim 1 wherein said keepers comprise a metal stamping having a pair of transversely spaced vertically extending walls and an integrally formed bridge member, said C-shaped slot having its opening formed adjacent said bridge member.

3. The invention as recited in claim 1 wherein said retaining bracket comprises a pocket portion having a vertically extending leg, a forwardly upwardly inclined leg, and a downwardly rearwardly inclined support leg.

4. The invention as recited in claim 1 wherein said rear spring bar is a U-shaped rod.

5. The invention as recited in claim 1 wherein said front spring bar has a transversely extending middle portion and rearwardly upwardly inclined U-shaped ends.

6. In a vehicle having a floor panel and a rear seating cushion, a latching arrangement that locks the seating cushion to the floor panel comprising a pair of laterally spaced and transversely aligned keepers fixed to the floor panel, each of said keepers having a pair of laterally spaced vertically extending side walls and an integrally formed bridge member, a C-shaped slot formed in each of said keepers and having an opening adjacent said bridge member, a retaining bracket fixed to the floor panel and located to the rear of and substantially midway between said keepers, said retaining bracket having a vertically extending leg and forwardly outwardly inclined leg forming a pocket opening toward said keepers, a pair of front spring bars located adjacent the front edge of the seating cushion and having a transversely extending middle portion and rearwardly upwardly extending arcuate portions, a rear spring bar located to the rear of said seating cushion and having a transversely extending end, said arcuate portions of the front spring bars and the ends of said rear spring bar attached to the underside of the seating cushion and located so that the relative positions of said middle portions and said center portions correspond to the relative positions of said slots and said pocket, said pocket adapted to accommodate and restrain rearward movement of the rear spring bar while said middle portions of said front spring bars are moved into said slots to lock the seating cushion to the floor panel.

References Cited
UNITED STATES PATENTS 2,613,732 10/1952 Dye et al. _____ 296—63 X
2,789,621 4/1957 Langtry et al. _____ 296—63

LEO FRIAGLIA, *Primary Examiner.*

J. A. PEKAR, *Assistant Examiner.*